US005520993A

United States Patent [19]

Lambert

[11] Patent Number: 5,520,993

[45] Date of Patent: May 28, 1996

[54] RECORDING MATERIAL AND METHOD OF MANUFACTURE

[75] Inventor: Ronald F. Lambert, Wayland, Mass.

[73] Assignee: Labelon Corporation, Canandaigua, N.Y.

[21] Appl. No.: 230,605

[22] Filed: Apr. 21, 1994

[51] Int. Cl.[6] .............................. B32B 7/02; B32B 27/20; B32B 27/30; B32B 27/36

[52] U.S. Cl. .......................... 428/215; 428/195; 428/323; 428/327; 428/331; 428/335; 428/336; 428/483

[58] Field of Search .................................... 428/323, 195, 428/335, 331, 327, 215, 336, 480, 483

[56] References Cited

U.S. PATENT DOCUMENTS

| | | | |
|---|---|---|---|
| 4,071,362 | 1/1978 | Takenaka et al. | 96/1.4 |
| 4,480,003 | 10/1984 | Edwards et al. | 428/329 |
| 4,489,122 | 12/1984 | Kammin et al. | 428/212 |
| 4,529,650 | 7/1985 | Martinez | 428/336 |
| 4,555,437 | 11/1985 | Tanck | 428/212 |
| 4,621,009 | 11/1986 | Lad | 428/216 |
| 5,104,721 | 4/1992 | Sun | 428/206 |
| 5,104,731 | 4/1992 | Gager | 428/323 |
| 5,130,177 | 7/1992 | Lu et al. | 428/195 |
| 5,130,189 | 7/1992 | Hart | 428/331 |
| 5,208,093 | 5/1993 | Carls et al. | 428/195 |

*Primary Examiner*—D. S. Nakarani
*Attorney, Agent, or Firm*—Nixon, Hargrave, Devans & Doyle

[57] ABSTRACT

A toner receiver sheet having excellent adhesion to toner particles, optical clarity and physical properties that reduce or eliminate sheet feeding problems in automatic copying machines is prepared by coating on a plastic support a thin layer of a dilute aqueous colloidal solution of an acrylic polymer, an electrically conductive organic compound and a small concentration of transparent, non-light scattering polysiloxane beads. The coating is dried and cured to form on the support a water-insoluble acrylic layer of less than 2 μm thickness and affixed thereto a distribution of widely spaced apart transparent polysiloxane spherical beads of 10 to 15 μm diameter.

19 Claims, 1 Drawing Sheet

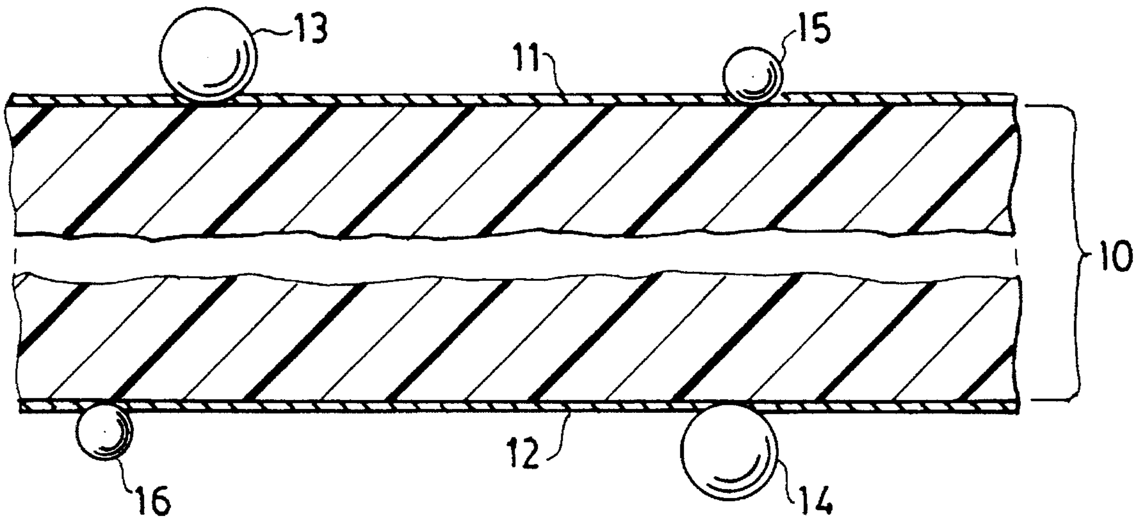
13
15
11
10
12
16
14

RECORDING MATERIAL AND METHOD OF MANUFACTURE

FIELD OF THE INVENTION

This invention relates to a recording material and, more particularly, to such a material, including coated films, for receiving toner images from an electrophotographic copying machine or toner printing from a laser printer.

BACKGROUND OF THE INVENTION

In electrostatographic imaging processes, such as dry electrophotographic copying, a pattern or image formed by electrostatically charged thermoplastic particles of toner powder is transferred from the surface of a photoconductor or other dielectric surface to a receiver material which can be in the form of sheets or a continuous web roll. The transfer is normally accomplished by electrically charging the receiver surface to a polarity opposite to that of the toner particles and then contacting the receiver with the photoconductive surface. After transfer of the toner particles, the receiver is passed through heated rollers to fuse the toner to its surface. A similar transfer and fusing of toner to a receiver occurs in laser printing.

Commonly, the receiver for dry toner particles is plain paper. Many thermoplastic toner materials adhere well to paper and form a satisfactory image or printing. When it is desired, however, to form a toner image on a plastic film, for example, in making a transparency for overhead projection, problems arise. One problem is the difficulty of adhesion of the usual toner particles to the kinds of films that are preferred for transparency printing. A particularly preferred type of transparent film for toner printing is a polyester film such as a film of biaxially oriented poly(ethylene terephthalate). Although, this kind of film has desirable physical properties such as thermal stability and can withstand the high temperatures encountered in electrophotographic copying machines, the polyester surface does not adhere well to the usual thermoplastic toner powders.

To improve toner adhesion to plastic receivers, the prior art has applied various coatings to their surfaces. In some instances these coatings may have improved the adhesion of toner to the receiver, but other problems have occurred. For example, in automatic copying machines, coated plastic sheets can be difficult to feed and transport rapidly and, when stacked in packages or in feeding trays and equilibrated to machine environment, the sheets often block or stick together. This results in multifeeds and jams. Especially in high temperature copiers, coated film sheets have caused serious jamming, with consequent delays in the copying operations. The prior art discloses toner receiving films having surface coatings that provide certain properties. For example, Hart, U.S. Pat. No. 5,130,189 discloses an imagable copy film comprising a biaxially oriented polyester substrate and an acrylic receiving layer. The latter can contain silica filler particles of small size i.e., less than 0.5 μm in a concentration of at least 5%. The patent to Sun, U.S. Pat. No. 5,104,721 discloses an electrophotographic printing medium comprising a polymeric substrate coated with a layer of a certain hardness and Tg and containing a pigment which provides a relatively high coefficient of friction. The patent to Carls, U.S. Pat. No. 5,208,093 discloses an electrographic article for color imaging comprising a polymeric film and a receptor layer formed of a thermoplastic resin such as polyester resins, styrene resins, polymethylmethacrylate resins, etc., but especially bisphenol A polyester of 0.5 to 10 μm thickness. The receptor is said to have an equivalent or lower storage elasticity modulus than the toner resin used for imaging. Certain polymeric, silica or starch particles of 5 to 25 μm diameter can be added to reduce pooling of fuser oil on transparencies.

Prior art polymeric toner receiving materials, however, continue to present problems and lack the properties most desired for toner imaging with electrophotographic copying machines. In particular, they lack the combination of properties needed for high quality imaging with electrophotographic copying machines having high speed duplex feeders and high temperature fusing stations. Pigmented toner-receiving layers of the prior art, for example, exhibit opacity or haze and high coefficient of friction.

A need, therefore, exists for an improved toner receiver material, particularly in plastic sheet form, of excellent clarity which can receive thermoplastic toner particles with good adhesion and good image quality and can feed reliably in copying machines, including high speed duplex copiers and laser printers by good engagement with feeding rolls, without blocking when stacked in feed trays and without sticking to machine parts and with good release from fuser rolls, especially in high volume applications. In accordance with the present invention such an improved toner receiver material and a method for its manufacture are provided.

BRIEF SUMMARY OF THE INVENTION

The toner receiver material of the invention comprises (a) a transparent polymeric support, (b) a water-insoluble, dried polymeric, toner-receiving surface layer on at least one side of said support, such layer having a thickness less than about 2 μm, said toner receiver material having a back to front static coefficient of friction less than 0.18 and a kinetic coefficient of friction less than 0.08 and a BEKK surface measurement less than 300 sec.

The invention also provides a novel method for the manufacture of toner receiver material which comprises a) coating on each side of a polymeric support a thin surface layer of an aqueous liquid composition having a solids content from about 1 to 10 weight percent and comprising
 water,
 a colloidal dispersion of an acrylic polymer,
 an organic thickening agent,
 a phospholipid compound and
 from 0.05 to 2 weight percent based on the solids content of said liquid composition of colorless, transparent polysiloxane spherical beads at least a portion of which have an average diameter of 10 to 15 μm, b) drying each said coated layer to form a dried layer having a thickness less than about 2 μm, and c) curing each said dried layer by (i) heating said layer and raising its temperature to at least about 200° F. for a period of time or (ii) by exposing the dried layer to ultraviolet or microwave irradiation, or both (i) and (ii), the duration and intensity of said heating or irradiation or both being sufficient to render said layer water-insoluble.

BRIEF DESCRIPTION OF THE DRAWINGS

The invention will be further described by reference to the drawings, the sole FIGURE of which is a diagrammatic cross section, not to scale, of a toner receiving sheet of the invention.

DETAILED DESCRIPTION

As shown by the enlarged cross-section in the drawing, the toner receiver material of the invention includes a transparent polymeric support 10, which in this embodiment is a transparent polymeric sheet having a thickness in the range from about 1 to 10 mils. Suitable polymers for the support can include transparent or opaque films of polyesters, polycarbonates, polyolefines, and other known supports for toner receiving materials such as toner receiver sheets used in making overhead projection transparencies, reflection prints and the like. An especially preferred support is a poly(ethylene terepthalate) film having a thickness in the range from about 3 to 7 mils. Most preferably the support is heat-stabilized, biaxially oriented polyester film as disclosed in U.S. Pat. No. Pat. No. 5,130,189 which is incorporated herein by reference.

Coated on each side of the support 10 are toner-receiving surface layers 11 and 12. In a preferred embodiment, these are dried and cured, thin acrylic polymer layers of the same composition. Affixed to the support by the thin acrylic polymer layer and distributed substantially uniformly across the layer are substantially spherical polymeric beads or particles 13, 14, 15 and 16. As shown in the drawing, these particles are larger in diameter (preferably, much larger) than the thickness of the acrylic layer and protrude therefrom. More specifically, the average diameter of at least a portion of the polymeric beads is in the range film about 10 to 15 μm. Sheet materials of the lowest coefficient of friction are obtained when all or at least 50 weight percent of the beads are of 10 to 15 μm diameter.

The concentration of the spherical beads relative to the amount of polymer surface layer on the support is low, e.g., in the range from about 0.05 to 2 weight percent and, preferably, is less than 1.5 weight percent. Consequently, the beads, in general, are widely and substantially uniformly spaced apart.

Transparent silicone (i.e, solid polysiloxanes) spherical beads of 10 to 15 μm average diameter are the preferred beads for incorporating in the surface layers of receiver materials of the invention. With such beads the coefficients of friction of the materials are exceptionally low, yet the surface irregularity is sufficient to provide good roller feeding. Especially preferred are poly(dimethyl siloxane) spherical beads such as GE SR436 beads of 12.5±2 μm average diameter which are available from General Electric Company. Other spherical polymeric beads can be used, however. Other suitable beads include the Soken MR13 acrylic beads of Esprit Chemical Company. These are colorless (i.e. non-pigment), transparent spherical beads of 9 to 13 μm average diameter, of cross-linked poly(methyl methacrylate), of which the monomers are 97 wt. % methyl methacrylate and 3 wt. % ethylene glycol dimethacrylate. They provide a reasonably low coefficient of friction and good roller feeding properties when added to the surface layer coating composition in a concentration of 0.05 to 2 wt. %, based on the solids content of the composition.

To improve the adhesion of the bead-containing acrylic surface layers to the support film 10, the film can first be coated with a thin tie layer or subbing layer not shown in the drawing, e.g., of less than 0.5 μm dried thickness, e.g., of 0.05 μm thickness, that has good adhesion to both the support film and the bead-containing acrylic layer. For example, the support film, such as a heat-stabilized polyester film can be coated with a thin clear layer of an acrylic polymer as disclosed in U.S. Pat. No. 5,130,189, cited above.

The acrylic polymer surface layers 11 and 12 are formed by coating on the support 10 thin layers of a dilute, aqueous colloidal solution or emulsion of the acrylic polymer. Dispersed in the aqueous solution are the transparent polysiloxane beads referred to above, an antistat agent and, preferably, a thickening agent. The dilute solution contains no more than about 10 weight percent solids and, preferably, from about 3 to 7 weight percent solids.

Since the solution has such a high water content, i.e., 90 to 97 weight percent, its viscosity is low and it is often desirable to include a thickening agent in the solution to increase the viscosity sufficiently that a continuous, uniform thin coating of the acrylic layer can be obtained without skips or bare spots on the support. A wide range of viscous organic thickening agents that are compatible with the acrylic polymer are suitable and are available commercially. A preferred thickener is a solution of a derivatized quaternary ammonium salt of hydroxyethyl cellulose which is available from Amerchol Co. as "UCARE LK" solution and whose chemical nomenclature is cellulose-2-hydroxyethyl-2-[hydroxy-3-[trimethylammononio]propoxy]ethyl-2-hydroxy-[3-trimethylammonio]propyl ether chloride. This aqueous solution has a low shear viscosity at 23° C. of about 28 cps as measured by a Brookfield viscometer Spindle #1 at 60 rpm. The Hercules high shear viscosity is 33 cps. The thickener can be added to the acrylic polymer solution in an amount sufficient to raise the viscosity of the solution to a level suitable for superior coating by microgravure reverse roll apparatus or other conventional coating means. A useful solution viscosity for coating with such apparatus on a polyester support is, for example, in the range from about 10 to 50 cps. This viscosity range can be achieved by adding a thickener, such as Amerchol UCARE LK to the coating solution in an amount equal to about 0.5 to 1.5 weight percent of the coating solution.

Although the indicated quaternized hydroxyethylcellulose is a preferred thickener, especially because of its compatibility with the acrylic binder polymer, other thickeners can be used. The function of the thickener is to raise the viscosity of the dilute or low solids coating solution sufficiently to facilitate satisfactory coating of a continuous, uniform thin acrylic layer in which polymeric beads are dispersed. For this purpose a high shear viscosity in the range from about 10 to 50 cps is preferred, as measured by a Hercules Viscometer Model DV-10 at 4400 maximum rpm.

Also included in the coating solution is an electrically conductive compound, the purpose of which is to control the surface resistivity of the coated toner receiver material. The preparation of the materials of the invention thus involves two objectives that are somewhat conflicting. One is to produce a material that has a sufficiently high surface resistivity that it can be electrically charged sufficiently to attract oppositely charged toner particles from a photoconductive surface. The other objective, however, is to produce a material that does not become triboelectrically charged during handling to such a degree that sheets of the material cling together and interfere with machine feeding. In accordance with the invention it has been discovered that the inclusion of a small amount of a compatible electrically conductive organic compound such as a phospholipid will provide a surface resistivity for the material which permits charging of the material for toner transfer but prevents electrostatic clinging together of sheets of the material.

The surface resistivity that provides this desirable balance of properties is in the range from about $10^8$ to $10^{13}$ ohms/sq. at 20° C. and 20% RH. Surface resistivity is measured in accordance with ASTM D4949 by means of a Monroe Model 272 resistivity meter manufactured by Monroe Instruments Co. Such a resistivity can be achieved by incorporating in the coating solution a minor amount, e.g., 5 to 20 weight percent of the dried acrylic polymer layer, of an electrically conductive organic compound that is compatible with, i.e., disperses uniformly in, the acrylic polymer and can serve as an antistat agent.

Preferred electrically conductive compounds which provide the desired surface resistivity and are compatible with acrylic polymers are phospholipid compounds. Preferred phospholipids include high molecular weight phospholipids such as lecithin and the phospholipid EFA, phospholipid SV and phospholipid PTC which are available from Mona Industries, Inc. The latter phospholipids have the structure:

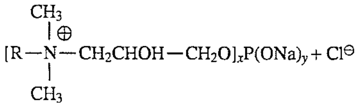

where x plus y=5. In such phospholipids R is a saturated or unsaturated long chain carboxylic acid (e.g., of 14 to 22 carbon atoms) amido alkyl (e.g., of 2 to 6 alkyl carbon atoms) radical. In phospholipid EFA, R is linoleamidopropyl; in phospholipid SV, R is stearamidopropyl and in phospholipid PTC, R is cocamidopropyl. Especially preferred is phospholipid EFA. Further discussion of such phospholipid compounds appears in the copending patent application of Ronald F. Lambert entitled "Ink Acceptor Material Containing a Phospholipid" U.S. Ser. No. 08/168,467, incorporated herein by reference.

Other suitable electrically conductive compounds which can be used in the indicated concentrations include dimethyldiallylammonium chloride, available from Allied Signal Corp.

An important distinguishing characteristic of the receiver materials of the invention is the low back to front coefficient of friction (both static and kinetic). This is measured in accordance with ASTM Method D1894 by means of a load cell/pulley sled device Model 32-06 manufactured by Testing Machines, Inc. and is in the range from about 0.02 to 0.18 (static) and in the range from about 0.01 to 0.08 (kinetic). These low coefficients of friction are achieved by incorporating a small concentration of spherical polymeric beads in the coating composition, preferably silicone beads and most preferably poly(dimethyl siloxane) beads of 10 to 15 μm average diameter. The distinguishing low coefficient of friction and the reduction of triboelectric charging of the sheets enables the sheets to move readily from a stack into the sheet feeding mechanism of a copying machine or laser primer. In addition, the large particle size silicone beads provide a desirable surface roughness which enables the feeding rolls of a copying machine to engage and transport the sheets. Thus, in accordance with the invention, by employing a low total concentration of silicone beads that protrude from the acrylic layers, the receiver materials of the invention have a combination of properties, namely, low frictional resistance, high surface roughness and a surface resistivity that reduces triboelectric charging, providing unexpectedly superior sheet feeding capability that rivals paper.

An important combination of properties of the receiver materials of the invention is believed to result from the incorporation of the described low concentration of colorless, transparent, non-light-scattering, spherical particles in the surface layer, at least a portion of which are of relatively large diameter, i.e., substantially larger than the thickness of the toner-receiving layer. The distinguishing combination of properties includes low coefficient of friction and yet surprisingly high surface roughness. The particles, such as poly(dimethylsiloxane) or acrylic polymer spheres and the cured coating together are of such low coefficient of friction and the particles are in such low concentration and, therefore, are widely spaced apart on the surface, that the coated, cured sheets slide past each other with very low coefficients of friction between their front and back surfaces. Despite their slipperiness or low static and kinetic coefficients of friction the sheets nevertheless also have a sufficiently high degree of surface irregularity or roughness, because of the protruding spherical particles, that the elastomeric feed rolls of a copying machine or printer can readily grip them and feed them rapidly. Thus, the materials of the invention feed as reliably as paper while providing superior image quality and clarity for overhead projection transparencies The surface roughness of the materials of the invention can be expressed in terms of a BEKK smoothness measurement. This well-known definition is measured by means of a BEKK Smoothness and Porosity Tester which is supplied by Büchel-Vander Korput Nederland BV of Veenendaal, Holland. The measurements are expressed in seconds and a high number such as 1000 sec. is characteristic of a smooth surface such as plate glass while a lower number indicates a rougher surface. The BEKK measurement of the materials of the invention is less than 300 sec. and preferably is in the range from about 1 to 100 sec. and, most preferably, is in the range from 10 to 40 sec.

Another valuable characteristic of the materials of the invention is their excellent light transmission clarity, as indicated by a low haze measurement. Thus, although the sheet materials include spherical beads in their coated layers, the thinness of the coating, the transparency of the beads and the low total concentration of beads result in a sheet material of exceptional clarity. Haze is measured with a Hazegard XL-211 hazemeter according to ASTM Method D 1003. The toner-receiving layers of the toner receiver materials of the invention contribute less than 0.3%. When the support is a transparent polymer film, such as a clear poly(ethylene terephthalate film), and with the preferred coating compositions the total haze of the coated receiver material of the invention is less than 1%; more especially no greater than about 0.6% and, in preferred embodiments is no greater than that of the support alone. In such preferred materials of the invention the toner-receiving surface layer or layers are optically clear and free of haze.

The materials of the invention are especially useful as transparent toner receiver materials for overhead protection. In this usage the excellent transparency and clarity of the colorless materials minimizes light scattering in overhead projection. In addition, the good toner receptivity of the materials results in a true presentation of information by overhead projection.

It should be understood also that the materials of the invention can also include opaque materials, such as materials in which the support polymer contains a pigment such as $TiO_2$, $BaSO_4$, $CaCO_3$ or polyethylene or other means to render the material opaque and light reflective. Alternatively, the support can be coated with or laminated to an opaque layer. Such opaque materials are useful for forming reflection prints in an electrophotographic copying machine or a laser printer.

In a preferred embodiment of the invention the described thin, toner receiving surface layer in which relatively large spherical beads are widely dispersed is present on both sides of the support film. In this embodiment of the invention the sheet materials have maximum flatness and reliable sheet feeding properties. If desired, however, the described toner receiving layer can be on only one side of the support film and the other side can be uncoated or coated with a different functional layer. For example, the other side can be coated with a liquid ink receiving layer or with a thermal imaging layer that contains silver behenate and propyl gallate developer. The ink receiving layer can be, for example, an ink jet receiver layer as disclosed in patent application of Lambert et al., Ser. No. 08/168,848 filed Dec. 16, 1993, U.S. Pat. No. 5,474,843 and a thermal imaging layer can be of the composition disclosed in Marginean et al., Ser. No. 08/119,721 filed Sep. 10, 1993, U.S. Pat. No. 5,424,182, both of which are incorporated herein by reference.

In another embodiment of the invention, a spherical-bead-containing polymer layer as described herein is coated over an imaging layer such as a silver behenate-containing, thermal imaging layer. In this embodiment the bead-containing surface layer serves as a protective layer and/or as a toner receiving layer. Alternatively or in addition, the bead-containing acrylic layer can be the surface layer on the opposite side of the support from the thermal imaging layer. In either case, this surface layer improves the sheet feeding properties of the thermal imaging material.

The method of manufacture of the materials of the invention provides still further valuable properties for the materials, including thinness of the coated layers, which contribute to transparency or low haze. In the method of the invention an aqueous coating solution is prepared which has a low solids content, namely, in the range from about 2 to 10 weight percent and, preferably, 3 to 7 weight percent. As previously stated, the components of the composition include an acrylic polymer, an electrically conductive compound, polymeric beads, and, preferably, a thickening agent.

The composition can be formulated by adding the other components to a dilute aqueous colloidal solution of the acrylic polymer. A preferred acrylic polymer is polyacrylic acid. However, other acrylic homopolymers are also useful, for example, poly(methyl acrylate) and poly(methyl methacrylate) as well as various acrylic copolymers such as styrene-acrylic acid copolymer and a copolymer of methyl methacrylate and butyl acrylate in a 1.4 to 1 molar ratio.

Commercially available examples of such acrylic polymer compositions include the preferred polyacrylic acid aqueous colloidal solution supplied by Morton Chemical Co. as "Lucidene 400" polymer solution. Other polymers of the "Lucidene" series include Lucidene 202 styrene-acrylic emulsion, Lucidene 246 styrene-acrylic copolymer latex, and Lucidene 603 styrene-acrylic emulsion. Other useful polymers include "Rhoplex" thermoplastic acrylic emulsions supplied by Rohm and Haas Company such as Rhoplex AC-261 acrylic copolymer emulsion and Rhoplex AC-73 modified acrylic acid copolymer emulsion.

Acrylic polymers are preferred for the toner receiving surface layers. It is within the scope of the invention, however, to form the surface layers from an aqueous solution or emulsion or other types of polymers that, like the described acrylic polymers, form a water-insoluble coating having a melting endotherm or Tm of 93° C. or higher (measured as described hereinafter) when cured by irradiation or heat treatment. An example of such a polymer is a styrene/butadiene copolymer (40/50 ratio) with a carboxyl modifier such as itaconic acid. Useful commercial products include the Dow 600 series of styrene/butadiene modified latices such as Dow 620, 640 and 681 latices.

In preparing the coating composition for the method of the invention the acrylic polymer emulsion or colloidal solution is diluted with water, pH-stabilized with $NH_4OH$ to pH 7–9 and solutions of the other components are added, with stirring, to obtain a composition of low solids content, i.e., 1 to 10 weight percent, but of sufficient viscosity for satisfactory coating.

The coating composition is then coated at room temperature on one side of the selected support, e.g., on a continuous moving web of poly(ethylene terephthalate) film. Various coating techniques can be used e.g., reverse roll coating, Meyer rod coating, slot extrusion coating or spray coating, but the preferred technique for obtaining a continuous, uniform thin layer is microgravure reverse roll coating.

In the preferred method of the invention the coating composition is applied at a coverage which will yield the desired dry thickness of about 0.10 to 2 μm. Immediately after receiving the layer of coating composition at the coating station, the continuous web passes through a drying chamber. Although the water content of the coating is high, e.g., 90 weight percent or higher, drying of the coating is completed after only a short time in the drying chamber because the coated layer is thin and the quantity of water to be evaporated is small.

In accordance with the method of the invention, after the acrylic polymer layer is dry, it is subjected to a curing treatment to harden the coating and render it water-insoluble. In one embodiment of the method the dried layer is cured by exposure to ultraviolet irradiation. Alternatively, it is cured by microwave irradiation or by heating the film to at least about 200° F. for sufficient time to harden the layer. Following the coating, drying and curing of the layer on one side of the support, the same operations are performed on the other side of the plastic support web.

In a typical operation in accordance with the invention, the polymeric web after being coated passes through a three-zone drying chamber about 100 feet in total length wherein warm or hot dry air contacts the coating at increasingly warmer temperatures in the three zones. Normally, the air temperature is in the range from about 190° to 220° F. During evaporation of the water, the film temperature remains relatively low until the film is dry. It then rises to approach the air temperature. In one embodiment of the invention, the dried film is maintained at approximately the air temperature, e.g. 200° F, for an additional 10 to 30 seconds after drying. With preferred polymer coatings, such as the Lucidene 400 acrylic polymer, this heat treatment like the UV or microwave irradiation is sufficient to cure the coating to its desired water insolubility and Tm or melting endotherm of at least 93° C. as measured with a differential scanning caloric meter. Such curing treatments likewise harden the coating and increase its abrasion resistance.

For acrylic polymer coatings which do not attain the desired water insolubility and abrasion resistance or hardness by heat curing as described above, curing by ultraviolet or microwave irradiation can be employed in accordance with the invention. Thus, at the end of the drying chamber distant from the coating station, the film can be passed under ultraviolet lamps to obtain irradiation at, e.g., 360 to 390 nm, of an intensity equal to 50 to 100 millijoules/sec/$cm^2$. Alternatively, the film can be exposed at the end of the chamber to microwave irradiation at 200 W. Heating or either of these irradiation treatments have proven sufficient to cure acrylic polymer emulsions without the addition of initiators or crosslinking agents to obtain the desired water insolubility and abrasion resistance as defined herein. To determine the curing conditions required for adequate water insolubility, a coating of the acrylic polymer 1 μm in thickness is coated on the polyester support and dried and cured at the selected conditions. The coating is then scraped from the support, weighed and placed in distilled water at 20° C. and 1% concentration. Adequately cured polymer does not dissolve.

In a typical use of a toner receiver material of the invention, a stack of sheets of the material, of sheet size suitable for feeding to a copying machine, is fed automatically by a roller feeder means to the toning station of an electrophotographic copying machine such as a Xerox 6711 color copier. At this station each sheet in turn receives, by electrostatic transfer or otherwise, a pattern of toner powder corresponding to the image of a document being copied. The sheet carrying the electrostatically-held toner particles is then conveyed through the nip of heated fuser rolls where the thermoplastic toner is fused by heating, e.g., to a temperature of 72° C. and pressed into bonding contract with the polymeric surface layer of the sheet. This fusing operation thus forms an imaged toner receiver sheet of the invention comprising the polymeric support, a water-insoluble polymer surface layer of properties previously defined and fused thermoplastic toner particles adhered to the surface layer.

The toner receiver materials of the invention provide excellent results with any dry thermoplastic toner powders, including colored toners and black monochrome toners and including various toner binder polymers such as styrene-acrylic copolymers, polyesters and the like. Likewise the materials provide good results in so-called hot copiers that have high temperature toner fusing stations, e.g., greater than 93° C. The cured coatings of the materials of the invention do not melt or flow at the toner fusing stations and because of the thinness of the coatings the fusing station heat is rapidly dissipated.

The invention is further illustrated by the following examples:

EXAMPLE 1

An aqueous coating composition was prepared by mixing an aqueous colloidal solution of Lucidene 400 acrylic polymer with water, quaternized hydroxyethylcellulose polymer, (UCARE LK polymer), phospholipid EFA and poly(dimethyl siloxane) spherical particles of 12.5±2 μm average diameter (SR436 beads obtained from General Electric Company), to obtain a mixture as follows:

| | |
|---|---|
| water | 95 g |
| Lucidene 400 polymer | 3.32 g |
| UCARE LK thickener | 0.84 g |
| Phospholipid EFA | 0.79 g |
| GE SR436 beads | 0.06 g |

The mixture, having a viscosity of 33 cps, (as measured with a Hercules Model DV-10 viscosimeter at 4400 rpm) was coated continuously by means of a microgravure reverse roll apparatus on a moving web of poly(ethylene terephthalate) film of 100 μm (4 mils) thickness at a coverage calculated to yield a dried layer of 0.68 μm thickness. The coated film web was drawn immediately thereafter through a drying chamber 100 feet in length in contact with dry air at about 200° F.

The poly(ethylene terephthalate) film was a heat-stabilized biaxially oriented film having on each side a thin (less than 0.5 μm) acrylic subbing layer, the film being of the type disclosed in U.S. Pat. No. 5,130,189, cited above and incorporated herein by reference.

In approximately the last 30 feet of the drying chamber, the film had been completely dried and the film temperature rose to approximately 200° F. before leaving chamber, at which point the film was wound on a take-up roll. The film was then rewound on another supply roll and the reverse side of the film was coated, dried and heated in the same manner. Subsequently, the film having the same coating on each side was cut into sheet lengths. These were tested as toner receiver sheets. The sheets prepared as described in this example had the following properties:

Coefficient of friction:

| | |
|---|---|
| Static | 0.10 ± 0.02 |
| Kinetic | 0.05 ± 0.02 |

Tabor abraser measurement: image density loss <16%*:

BEKK surface measurement: 55 sec.

Acrylic polymer surface layer thickness: 0.68 μm

Surface resistivity: $10^{12}$ ohm/sq. at room temp., 20% RH

Total Haze: 0.4%

* ASTM D 1044-83, CS 10F reference wheel, 25 revolutions, black toned image

The described sheets were imaged with dry black toner powder in a commercial electrophotographic office copying machine with excellent results. The image densities were equivalent or superior to those obtained with commercially available, transparent toner receiver sheets and the materials of the invention were superior in sheet feeding properties.

One of the advantages of the toner receiver materials of the invention is their resistance to melting or flow when printed or imaged with toner in a high temperature copier or laser primer. Thus, preferred supports are heat stable polyesters as disclosed in U.S. Pat. No. 5,130,189 cited above. In addition, however, the surface layer is also high melting. The Tm or melting endotherm of a preferred surface layer composition has been determined by measuring the Tm of an extract of the cured coating of Example 1 (Lucidene 400 acrylic polymer with addenda) with a Perkin Elmer differential scanning calorimeter (DSC), model #7. By comparison the Tm of the polyester support film is 243° C. The following table lists Tm measurements for the Example 1 surface layer and for three commercially available toner receiver sheet materials, indicated as Materials A, B and C. Measurements of glass transition temperatures (Tg) were also attempted but for the coating of Example 1 and commercial material C no Tg was detectable.

| Toner Receiver Material | Tg° C. - coating on PET substrate | Tm° C. - from extract; all transitions | Tm° C. - extract; main component peaks |
|---|---|---|---|
| A | 760 | 118°; 124°; 138°; 141°; 142° | 118°; 124°; 141° |
| B | 18°, 88°, 95° | — | — |
| C | none detectable | 104°; 112°; 118° | 118° |
| Example 1 | none detectable | 124°; 128°; 132° | 132° |

Another toner receiver material of the invention is described in the following example.

EXAMPLE 2

In this example the coating composition for the toner receiving layer, the support film and the method of preparation were the same as in Example 1, except that the transparent poly(dimethylsiloxane) spherical beads consisted of 45 wt. % GE SR344 beads of 4.5±2 μm diameter and 55 wt. % GE SR436 beads of 12.5±2 μm diameter. The total weight percent of such beads in the coating composition was 0.06 g. as in Example 1. The coating coverage was somewhat greater to provide an acrylic layer having a dried and cured thickness of 1.5 μm. After coating, drying and curing the material as in Example 1, the properties of sheets of the material were measured, with the following results:

Coefficient of friction:

| | |
|---|---|
| Static | 0.12 |
| Kinetic | 0.07 |

Tabor abraser measurement: image density loss <14%:

BEKK surface measurement: 87 sec.

Surface resistivity: $2\times10^{11}$ ohm/sq.

Total Haze: 0.4%

The next example describes another toner receiver material of the invention.

EXAMPLE 3

In this example the curable polymer component of the coating solution was Rohm and Haas AC261 acrylic emulsion which is an aqueous acrylic emulsion, of which the acrylic polymer is believed to be methyl methacrylate/butyl acrylate copolymer having a 1.4:1 mol ratio of the monomers. Other components of the coating composition were: Aerosol OT sodium dioctylsulfosuccinate, a product of American Cyanamid; GE SR 346 poly(dimethyl siloxane) spherical beads of 12.5±2 μm average diameter; dimethyldiallylammonium chloride electrically conductive compound and water. Weight percentages of the components in the coating composition were as follows:

| Component | Wt. % |
|---|---|
| Rohm and Haas AC261 polymer | 10.15 |
| Aerosol OT surfactant | 0.06 |
| Poly(dimethylsiloxane) beads | 0.10 |
| Dimethyl diallyl ammonium chloride | 0.70 |
| Water | 88.99 |

The resulting composition, having a viscosity at room temperature and 20% RH of 6.1 cps, was coated, dried and cured on both sides of the same type of biaxially oriented polyester film as in Example 1. The resulting toner receiver material had the following properties:

Coefficient of Friction:

| | |
|---|---|
| Static: | 0.16 |
| Kinetic: | 0.09 |

BEKK measurement: 120 sec.

Resistivity: $2\times10^{11}$ ohm/sq.

Total Haze: 0.6%

When imaged with black Xerox thermoplastic toner powder in a Xerox 5365 copying machine, the imaged film had a maximum optical density ($D_{max}$) of 1.8 and a minimum optical density ($D_{min}$) of 0.11.

The next example describes an opaque receiver material of the invention.

EXAMPLE 4

A receiver material was prepared by coating the same coating composition as in Example 1 on both sides of a white opaque poly(ethylene terephthalate) film support with drying and curing as in Example 1. The resulting receiver material had a BEKK measurement of 150 sec., static and kinetic coefficients of friction of 0.11 and 0.07, respectively; a resistivity of $5\times10^{12}$ ohms/sq. and receiver layer thicknesses of 0.8 μm. When imaged in an electrophotographic copying machine having a high temperature toner fuser, the resulting image exhibited a $D_{max}$ of 1.5 and a $D_{min}$ of 0.08.

The invention has been described in detail with particular reference to preferred embodiments thereof, but it will be understood that variations and modifications can be effected within the spirit and scope of the invention.

I claim:

1. A toner receiver material which comprises:

(a) a polymeric support, and (b) a water-insoluble, polymeric toner-receiving surface layer on at least one side of said support, said layer having a thickness from about 0.10 to about 2 μm, said layer formed by coating thereon a composition comprising from 0.05 to 2 weight percent, based on the solid content of the composition, of spherical polymeric particles, at least 50 weight percent of said particles having an average diameter of 10 to 15 μm, said toner receiver material having a back to front static coefficient of friction from about 0.02 to about 0.18, and a kinetic coefficient of friction from about 0.01 to about 0.08 and a BEKK surface measurement from about 1 to about 300 sec., and wherein said toner receiver material has a total haze of less than 1%.

2. A material according to claim 1 wherein said material has a BEKK surface measurement of about 1 to 100 sec.

3. A material according to claim 2 having a surface resistivity from about $10^8$ to $10^{13}$ ohms/sq. at 20° C. and 20% RH and wherein said layer is optically clear and free of haze and said support is transparent.

4. A material according to claim 3 having spherical polymeric particles protruding from said surface layer in a concentration of from 0.5 to 2.0 wt. % based on the weight of said surface layer.

5. A material according to claim 4 wherein the thickness of said surface layer is from about 0.10 to about 1.5 μm.

6. A material according to claim 1 having a surface resistivity from about $10^8$ to $10^{13}$ ohms/sq. at 20° C. and 20% RH.

7. A material according to claim 1 wherein spherical polymeric particles of 10 to 15 μm average diameter are affixed to said support by and protrude from said surface layer.

8. A material according to claim 7 wherein said particles comprise relatively large particles of 10 to 15 μm average diameter and relatively small particles of 3 to 6 μm average diameter and the weight ratio of said large to said small particles is in the range from 60:40 to 40:60.

9. A material according to claim 7 wherein said surface layer is an acrylic layer and said particles are poly(dimethylsiloxane) particles in a concentration of about 0.05 to 2 weight percent based on the weight of the acrylic surface layer.

10. A material according to claim 8 wherein one side of said material is an ink receiving surface and is printed with ink and the other side is a toner receiving surface comprising said acrylic layer and said transparent beads.

11. A material according to claim 7 wherein said surface layer has a melting temperature greater than 93° C.

12. A material according to claim 11 wherein said surface layer contains an electrically conductive compound and said surface layer has a surface resistivity from about $10^8$ to $10^{13}$ ohms/sq.

13. A material according to claim 12 wherein said conductive compound is a phospholipid in a concentration from about 0.01 to 0.9 weight percent based on the total weight of said surface layer.

14. A material according to claim 13 wherein said phospholipid is of the formula $$[R-\overset{\overset{CH_3}{|}\oplus}{\underset{\underset{CH_3}{|}}{N}}-CH_2CHOH-CH_2O]_xP(ONa)_y+Cl^{\ominus}$$

wherein R is linoleamidopropyl and x+y=5.

15. A material according to claim 12 wherein said support is transparent and said material has a haze level no greater than that of the support.

16. A material according to claim 15 having the same surface layer composition on each side of the support.

17. A material according to claim 15 wherein said support is a poly(ethylene terephthalate) film having a thickness from about 1 to 10 mils.

18. A material according to claim 11 wherein said material includes a thermal imaging layer on one side of said support and a particle-containing layer as a surface layer over said thermal imaging layer or on the opposite side of said support.

19. A toner receiver material which comprises a transparent polymeric support sheet a thin layer on both sides of said sheet which is formed by ultraviolet or microwave irradiation or heat curing of a dried layer formed by coating on said sheet a liquid composition comprising a) water, b) a colloidal solution of an acrylic polymer, c) a viscous organic thickener, d) a phospholipid compound, and e) from 0.05 to 2 weight percent, based on the solids content of said composition, of polysiloxane spherical beads at least 50 weight percent of said beads having an average diameter of 10 to 15 μm, the solids content of said liquid composition being from about 1 to 10 weight percent, the thickness of the dried layer on each side of said sheet being from about 0.10 to about 2 μm, said sheet having a back to front static coefficient of friction of 0.02 to 0.18 and a kinetic coefficient of friction of 0.01 to 0.08, the layer on each side of said sheet being water insoluble and having a BEKK surface measurement of 1 to 100 sec, and wherein said toner receiver material has a total haze of less than 1%.

* * * * *